United States Patent [19]

Hassler, Jr.

[11] Patent Number: 5,149,963
[45] Date of Patent: Sep. 22, 1992

[54] FIBER-OPTIC POSITION SENSOR INCLUDING PHOTOVOLTAIC BI-CELL

[75] Inventor: William L. Hassler, Jr., El Toro, Calif.

[73] Assignee: Parker Hannifin Corporation, Cleveland, Ohio

[21] Appl. No.: 547,903

[22] Filed: Jul. 3, 1990

[51] Int. Cl.⁵ ............................................... H01J 5/16
[52] U.S. Cl. ............................. 250/227.21; 250/227.24
[58] Field of Search .................... 250/227.11, 227.19, 250/227.21, 231.1, 208.2, 227.24; 350/96.29, 96.2

[56] References Cited

U.S. PATENT DOCUMENTS

| | | | |
|---|---|---|---|
| 3,758,784 | 9/1973 | Vischulis | 250/227.11 |
| 4,631,401 | 12/1986 | Parkhurst et al. | 250/227.21 |
| 4,687,927 | 8/1987 | Iwamoto et al. | 250/227.21 |
| 4,897,542 | 1/1990 | Dakin et al. | 250/227.21 |

OTHER PUBLICATIONS

Bulletin MTI-1000 "Fotonic ™ Sensor" (From Instruments Division, Mechanical Technology Inc.) Jun. 1986.

Primary Examiner—David C. Nelms
Attorney, Agent, or Firm—Christopher H. Morgan

[57] ABSTRACT

A fiber-optic position sensor includes a light source, a light detector that produces analog electrical signals proportional to the intensity of incident light on the detector, and fiber-optic bundles for transmitting illumination light to an object, transmitting reflected light from the object to the detector, and reference light from the light source directly to the detector. Electronic circuits are also provided for use with the optical position sensor for processing the signals from the detector to determine the position of the object. The detector is a photovoltaic bi-cell having two discrete regions, the first being used to detect the reference light and the second being used to detect the reflected light. A mounting block configuration is also provided to conveniently hold the optical elements.

20 Claims, 4 Drawing Sheets

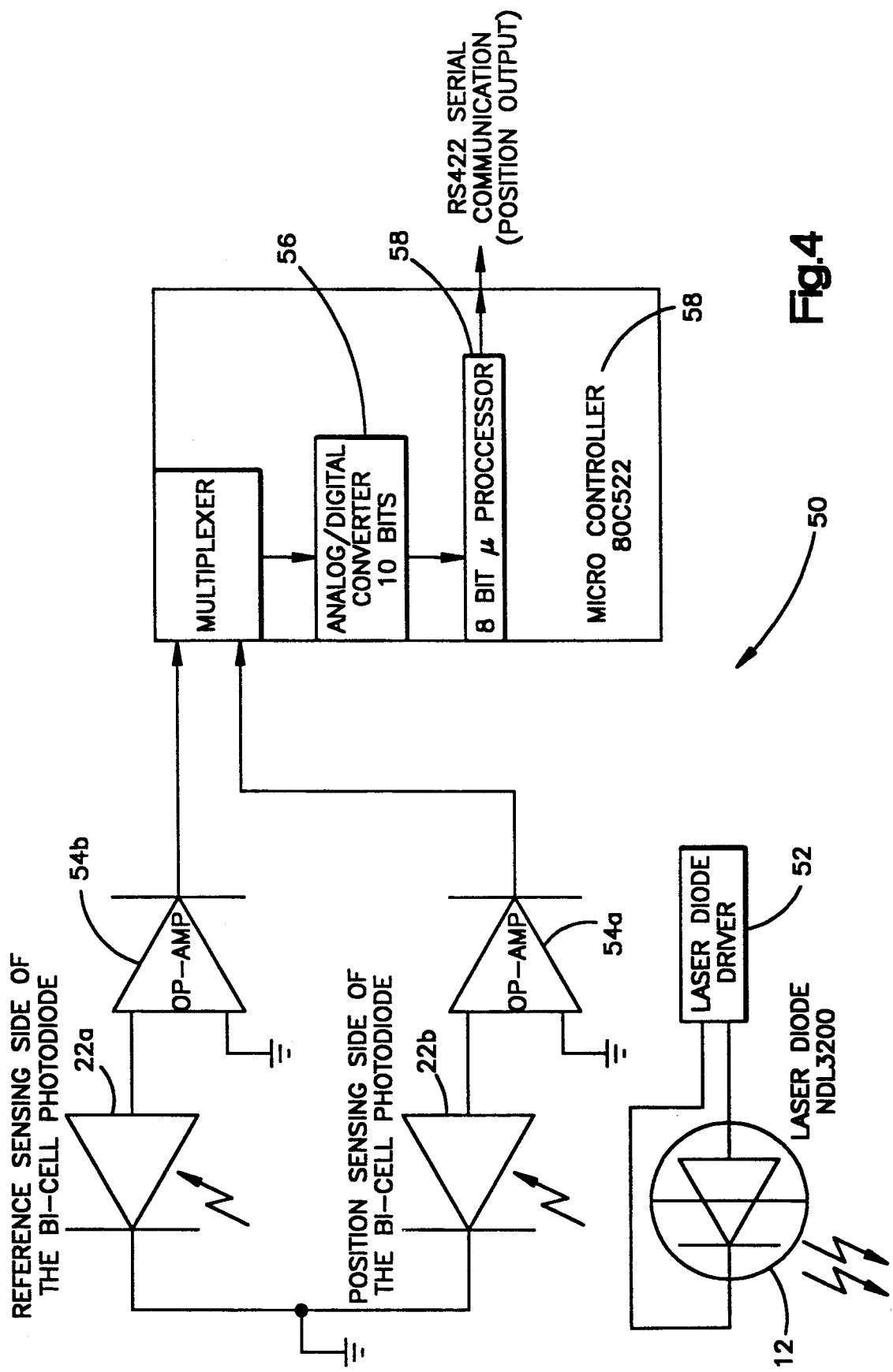

FIBER-OPTIC POSITION SENSOR INCLUDING PHOTOVOLTAIC BI-CELL

BACKGROUND OF THE INVENTION

The invention generally relates to position transducers or sensors which detect the relative position of an object on one or more axis of movement. More specifically, the invention pertains to position sensors that utilize fiber-optics to precisely determine positions of an object on an axis.

The use of fiber-optics in position sensing devices has not been widespread due to high costs associated with the fiber-optic cables. Variations caused by drift over time and temperature in the light sources and detectors eventually cause false readings, therefore, prior systems have required frequent calibration to compensate for these time and temperature changes. Fiber optic cables have also been difficult to use other than in telecommunications because kinks or sharp bends in the cable attenuate light thus causing false readings at the light detector.

SUMMARY OF THE INVENTION

The present invention overcomes the above deficiencies of prior devices by providing a position sensor that is less sensitive to cable bending and variations over time and temperature, thus reducing calibration requirements and improving accuracy and reliability of the sensor. The invention further provides a less expensive position sensor that is simple to manufacture and use.

According to one aspect of the invention, such a position sensor includes a fiber-optic cable means that transmits illumination light from a light source, such as a light emitting laser diode, to a reflective object. The object reflects a certain amount of the illumination light and the fiber-optic means transmits the reflected light to a light-sensitive detector. The light-sensitive detector, such as a photovoltaic cell, converts incident light to analog electrical signals, which signals can then be processed by appropriate electronic circuits to determine the object's position.

According to another aspect of the invention, the fiber-optic cable means comprises three separate bundles. One bundle transmits light from the light source to a second fiber-optic bundle. The second fiber-optic bundle is optically coupled to the first bundle and transmits the illumination light to the object, as well as transmitting reflected light from the object to the light detector. A third fiber-optic bundle transmits reference light from the light source directly to the light detector. Alternatively, a bifurcated fiber-optic cable may be used with the reference bundle. The use of reference light overcomes the problems associated with variations over time and temperature of the light source and detector, thus reducing the need for repetitive and time consuming calibration.

Still another aspect of the invention is the use of a photovoltaic bi-cell for the light detector. The bi-cell provides two distinct detector regions, the first region being used to detect reflected light from the object, and the second region being used to detect the reference light. The fiber-optic bundles can directly contact the bi-cell to minimize channel cross-talk and/or signal losses.

These and other aspects and advantages of the present invention will be appreciated by those skilled in the art from the detailed description of the preferred embodiments set forth hereafter in view of the accompanying drawings.

BRIEF DESCRIPTION OF THE DRAWINGS

FIG. 4 is an electrical schematic diagram of a circuit useful with the position sensor shown in FIG. 1 to determine positions of an object.

DESCRIPTION OF PREFERRED EMBODIMENTS

Figure 1:
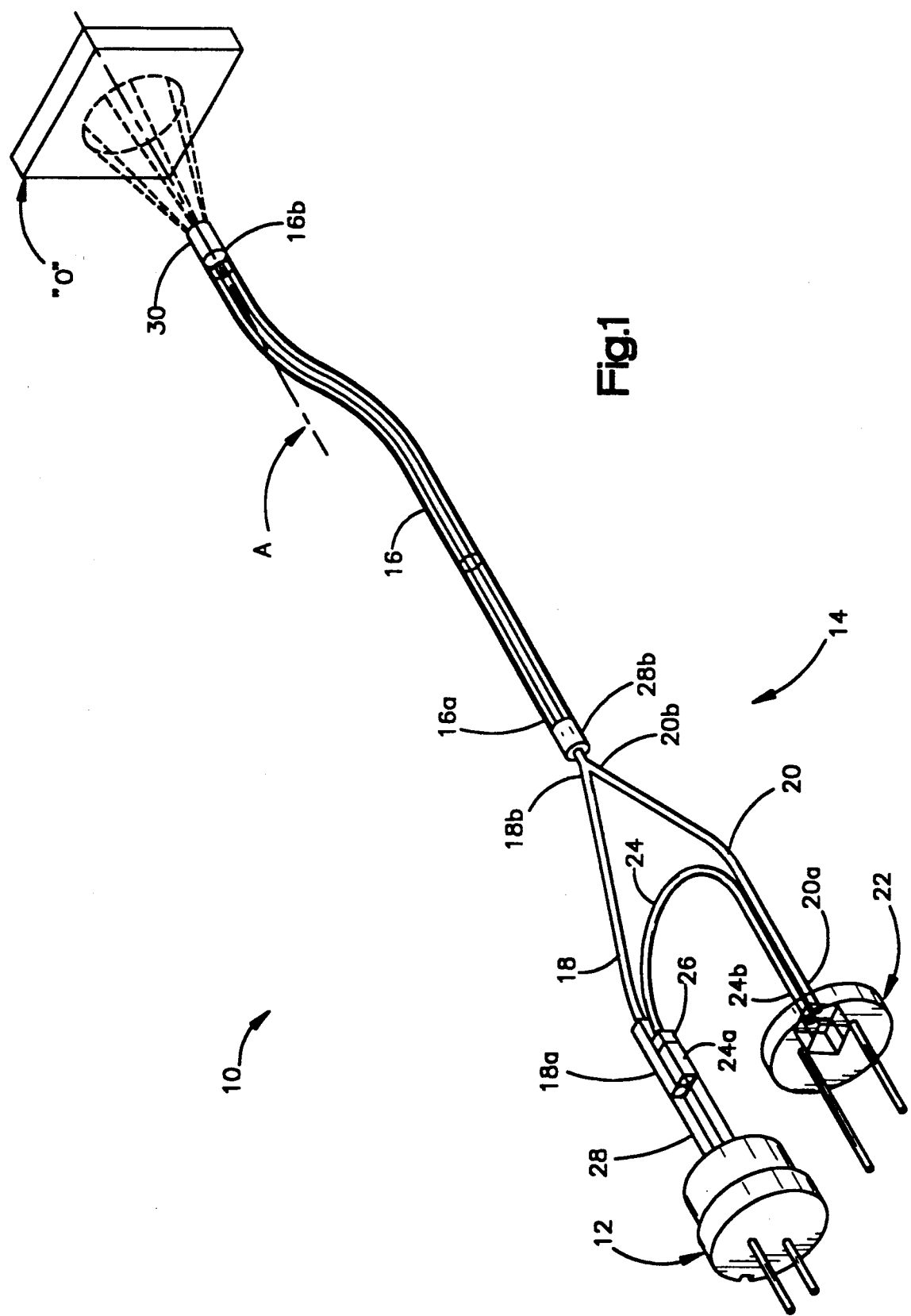
FIG. 1 is a schematic representation of the optical elements used in a position sensor according to the present invention.

With reference to FIG. 1, the present invention provides a precise position sensing device 10 that determines the relative position of an object (labeled "O" in FIG. 1) along an axis A. It is assumed for purposes of describing the invention, that the object O can move back and forth along the axis. This description is only exemplary in nature, however, it being appreciated by those skilled in the art that the invention can be used in any application involving the detection of any object's position along any axis of movement. For example, the invention has been successfully used to detect the distance between turbine fan blades and the turbine housing as each blade rotates at high speed past the optical sensor. The movement of the blades is, of course, rotational and transverse the optical axis, as well as parallel to the optical axis. The object must, of course, be capable of reflecting light.

The position sensor 10 includes a light source 12 which may be any one of a number of light emitting devices such as a laser diode or infrared light emitting diode. The light source can produce light in the visible or invisible spectrum. A particular device that has been found effective is laser diode NDL 3200 available from NEC Corporation. Monochromatic light sources are preferred, however, they are not the only light sources useful with the invention.

A fiber-optic assembly 14 is provided to control the transmission of light from the light source 12. In the preferred embodiment, fiber-optic assembly 14 includes a flexible fiber-optic cable 16 that has a large number of optical fibers bundled together in a conventionally randomized manner.

The fiber-optic assembly 14 also includes a fiber-optic bundle 18 that has one end 18a optically coupled to the light source 12, and a distal end 18b optically coupled to one end 16a of the fiber-optic cable 16. To simplify assembly, the fiber-optic bundle 18 ends can simply be abutted against both the light source 12 and the fiber-optic cable end 16a or, as shown in FIG. 1, a mono-fiber mixer 28 can be used as will be explained hereinafter. The combination of the fiber-optic bundle 18 and about half of the fibers in the fiber-optic cable 16 transmits light from the light source 12 to the object O and will hereinafter be referred to as the "illumination bundle", it being understood by those skilled in the art that a single piece bundle could be used though such an arrangement is not preferred.

Another fiber-optic bundle 20 is optically connected between the fiber-optic cable 16 and a light detector or sensor 22. The light detector 22 is preferably a photovoltaic device such as, for example, SD113-24-21-021 that is a bi-cell available from Silicon Detector Corporation. The light detector 22 has at least two distinct detector regions that convert incident light into analog electrical signals. The electrical signals produced by the light detector 22 are proportional to the intensity of light incident on the light-sensitive regions. The advantage of a bi-cell and similar devices over using two separate detectors is that the light-sensitive regions are fabricated adjacent each other under virtually identical processes so that their photovoltaic responses should also be virtually identical, thereby minimizing the need for calibrating out differences that could give false position readings.

The output end 20a of the fiber-optic bundle 20 is optically connected to one of the light-sensitive regions of the detector 22, and the distal end 20b may be optically coupled to the first end 16a of the fiber-optic cable 16 in the same manner as the illumination bundle distal end 18b. Preferably the output end 20a of the fiber-optic bundle 20 is in direct physical contact against the detector 22 light-sensitive region to minimize loss of light and cross-talk to the other detector region.

The fiber-optic bundle 20 receives reflected light from the object O via about half of the fibers in the fiber-optic cable 16. Thus, the combination of the fiber-optic bundle 20 and about half of the fibers in the cable 16 will hereinafter be referred to as the "measurement bundle", it being understood by those skilled in the art that the measurement bundle could also be a unitary bundle.

While in the preferred embodiment the fiber-optic assembly 14 has been described as being a three-piece or trifurcated unit, an alternative choice is to use a bifurcated fiber-optic cable such as 25-003-1 available from General Fiber Optics, Inc. wherein the assembly 14 is available as a completed bifurcated cable assembly.

Another fiber-optic bundle 24 is optically coupled between the light source 12 and the other light-sensitive region of the light detector 22. The input end 24a of the bundle 24 is coupled to the light source 12 in the same manner as the illumination bundle, and the output end 24b is coupled to the detector 22 in a manner similar to the measurement bundle. This fourth fiber-optic bundle 24 is hereinafter referred to as the "reference bundle".

A neutral density filter 26 such as 03FNG023 available from Melles Griot may be used with the reference bundle to reduce the intensity of reference light transmitted from the light source 12 to the detector 22. This may be needed in certain applications when the detector 22 would otherwise be saturated by the reference light.

The mono-fiber mixer 28 can be used to optically couple the illumination and reference bundles to the light source 12. The mixer 28 is a mono-fiber having a predetermined geometric configuration adapted to the divergence pattern of the particular light source. That is, the present invention can conveniently be used with a wide variety of light sources. However, each type of light source will have a particular divergence pattern of the emitted light. The purpose of the mixer 28 is to take one or more concentrated light sources (whether such source be a direct light emitter such as laser diode or the output of a light transmitter such as optic fibers) at one end of the mixer and create a more uniform area light source at the other end of the mixer.

The key to properly configuring and sizing a mono-fiber to function as a mixer for a laser diode emitter, infrared emitter or fiber bundle emitter is to use a geometry that allows the most light from the light emitter to enter into the mixer. Thus, the numeric aperture of the mixer must be larger than the numeric aperture of the light source. Every emitter is characterized by at least one divergence angle of the emitted light. It is the divergence angle that sets the needed geometry of the mixer.

A laser diode presents a particularly difficult case because the emission pattern is elliptical and not circular. The elliptical pattern is defined by two divergence angles, one of which is in the perpendicular direction and the other being in the parallel direction. For the laser diode noted hereinbefore, NDL 3200, the divergence angles are nominally 34 degrees in the perpendicular direction and 7 degrees in the parallel direction.

Continuing with the example of the NDL 3200 device, the emission face of the semiconductor die to the top of the laser diode case where the mono-fiber mixer will rest is 1.15 mm (or 0.045 inches). Multiplying this distance (i.e. offset) times the tangent of the two divergence angles gives the actual size of the ellipse as it enters the mono-fiber mixer. This is a radial distance of 0.77 mm (or 0.031 inches) in the perpendicular direction, and 0.15 mm (or 0.006 inches) in the parallel direction giving a total ellipse size of 1.54 mm by 0.28 mm (or 0.062 in. by 0.012 in.) as the beam enters the mixer. To allow for misalignment of the mixer to the laser diode, the core glass of the mono-fiber mixer should be 1.91 mm by 0.64 mm (0.075 in. by 0.025 in.). The cladding glass of the mono-fiber mixer should nominally be about 0.06 mm thick (0.002 in.). The length of the mono-fiber mixer should be such as to allow a ray emitted from the die at a quarter of the most constricted divergence angle to bounce at lease once inside the mono-fiber mixer. In this case, the angle is in the parallel direction, and a quarter of the divergence angle is 1.75 degrees. Dividing half the core-glass thickness in this direction which is 0.32 mm by the tangent of 1.75 degrees gives a distance of 10.47 mm (or 0.412 inches). The distance from the top of the case to the die is then subtracted from 10.47 mm to give a minimum length of 9.32 mm for the mixer, which is extended to 10.2 mm to give some margin. This gives the final dimensions of the mixer as about 2.03 mm by 0.76 mm by 10.2 mm.

In the case of sizing a mixer 28 to an infrared emitter or fiber bundle, the technique is basically the same but simpler because there is only one divergence angle of the emitted light (that is, the emission pattern is conical). In the case of connecting a fiber bundle to a mixer no offset has to be considered as the fibers terminate in direct contact with the mono-fiber mixer input end.

Those skilled in the art will readily appreciate that use of the mixer 28 at the light source 12 as shown is preferred but may be omitted in applications where a certain loss of light can be tolerated. Using the mixer 28 provides a more uniform distribution of light to the connected fiber bundles. A second mono-fiber mixer 28b can also be used to optically connect the branched illumination and measurement bundles 18, 20 to the fiber-optic cable 16, for purposes that will hereinafter be explained.

A collimating device 30 such as a gradient index lens (GRIN) as SLW-3.0 available from NSG America, Inc. may be optically connected to the output end of the fiber-optic cable 16. Use of the collimating device effectively reduces the numerical aperture of the fiber-optic cable 16 at the output thereby increasing the measurement range of the device 16. In this regard, the fiber-optic bundles identified hereinbefore are preferably of higher numerical aperture than conventional telecommunications fiber-optics so as to make the device 10 less sensitive to bending and kinking of the fiber-optic cable and bundles.

In operation, illumination light from the source 12 is transmitted by the illumination bundle to the object. The output end 16b of the fiber-optic cable 16 is positioned, of course, proximate the object. Some of the illumination light is reflected back into the cable 16 and transmitted by the measurement bundle to one of the discrete light-sensitive regions in the light detector 22. Reference light is transmitted by the reference bundle 24 to the other light-sensitive region of the detector 22. By comparing or taking a differential measure of the amount of reflected light to the reference light, the position of the object can be determined relative to the distal or output end 16b of the fiber-optic cable.

Figure 3:
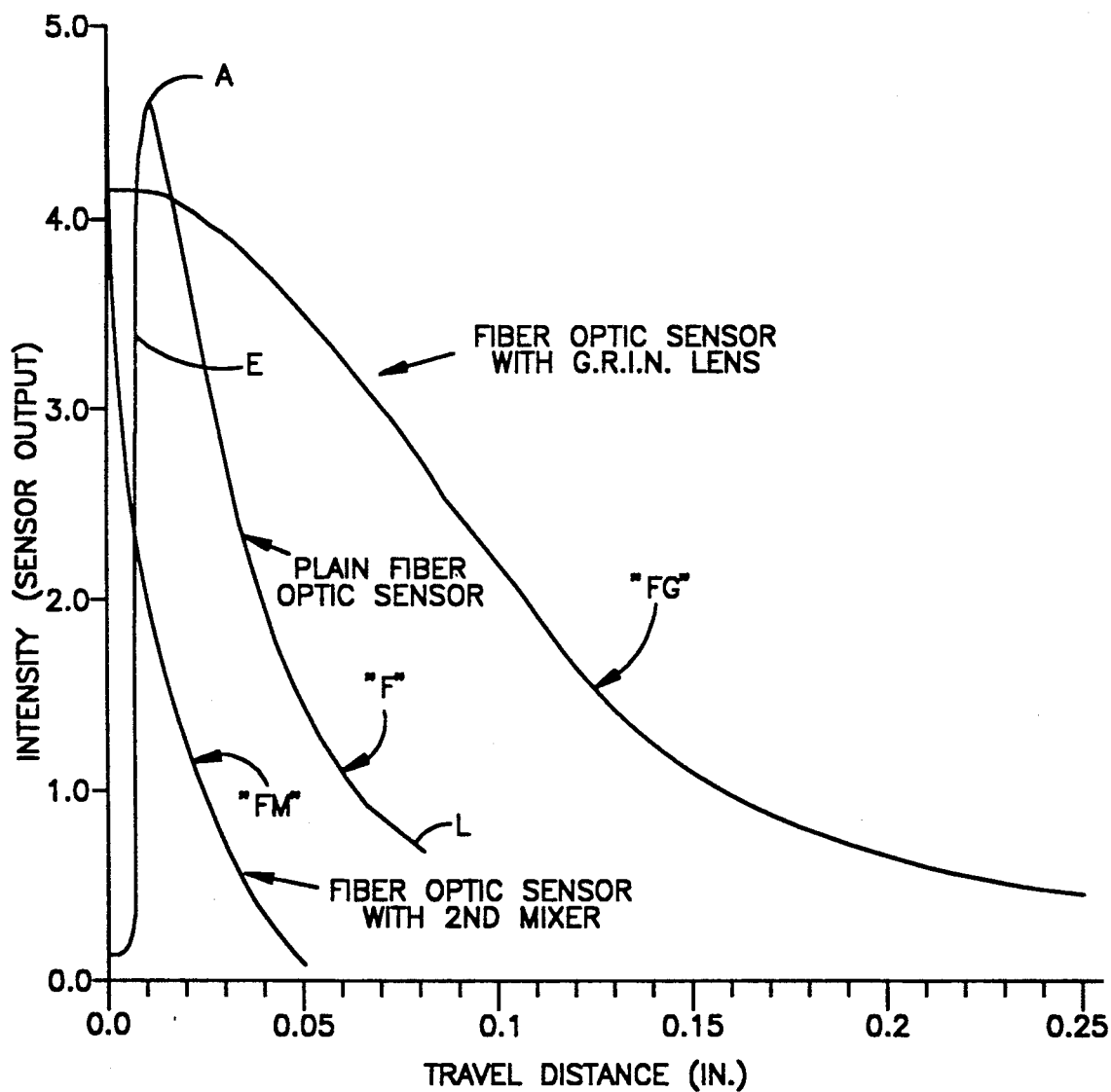
FIG. 3 is a chart of the operating characteristics of typical devices according to the present invention.

FIG. 3 represents typical function curves of a device 10 according to the present invention. FIG. 3 shows the relationship between the reflected light intensity (power) and the distance of the object from the fiber-optic cable. As shown on curve F, there is a point A where a maximum amount of light is reflected back to the fibers in the measurement bundle. On either side of point A the amount of light reflected back decreases, but not in a uniform manner. As the object gets closer to the cable 16, the amount of reflected light received by the cable 16 falls off in a somewhat linear manner, as along front portion L of the curve. As the object moves further from the cable 16 the amount of reflected light received by the cable 16 falls off in a somewhat inversely proportional manner, as along the back portion E of the curve. Since there are numerous instances of two positions giving the same power reading, the user must determine through calibration when the device is operating on the front or back side of the curve F.

The data obtained to create the type of function curves shown in FIG. 3 can be used, of course, to piecewise linearize the output information from the sensor 10. That is, the output signals from the detector 22 can be linearized by appropriate circuitry in a conventional manner so that the readings can be converted to equivalent distance o position information. This calibration information can then be stored in appropriate memory devices in the form of a look-up table. Since a differential measure is used with the reference and measured light, the readings from the detector 22 will be less sensitive to changes in light source intensity over time and temperature. That is, the basic shape of the function curves in FIG. 3 that define the distance vs. intensity relationship will not change though actual reading levels may change with light intensity.

As previously described herein, a second mono-fiber mixer 28b can be used to couple the bundles 18, 20 to the cable 16. This effectively makes all the fibers in the cable 16 both transmitters of illumination light to the object and receivers of reflected light from the object. This effectively eliminates the front side of the function curve since there is minimal loss of reflected light as the object gets closer and closer to the cable 16. In fact, maximum reflection occurs as the object contacts the cable 16. Curve FM of FIG. 3 shows a typical function curve when the second mixer 28b is used. Furthermore, curve FG shows the function curve for the sensor 10 when the collimating device 30 is used. The collimating device 30 in effect both collimates the light emitted from the cable 16 and acts somewhat as a mixer and converting all the fibers in cable 16 into receivers. Thus again the front end of the curve is eliminated and in addition the range of the device 10 is increased though with lower gain.

As explained hereinbefore, use of the reference light and comparing it to the reflected light removes errors in readings caused by changes in the characteristics of the light source 12 or the detector 22 due to time and/or temperature. It has also been found that the effect of light intensity changes depends on where on the function curve the calibration measurement is made. Again, use of the reference signal allows the data to be compensated for such variations. By using the bi-cell 22 variations between the detector regions are also minimized which simplifies calibration and improves accuracy. Of course, a detector 22 with more than two light-sensitive regions can be used when using multiple measurement cables.

Figure 2:
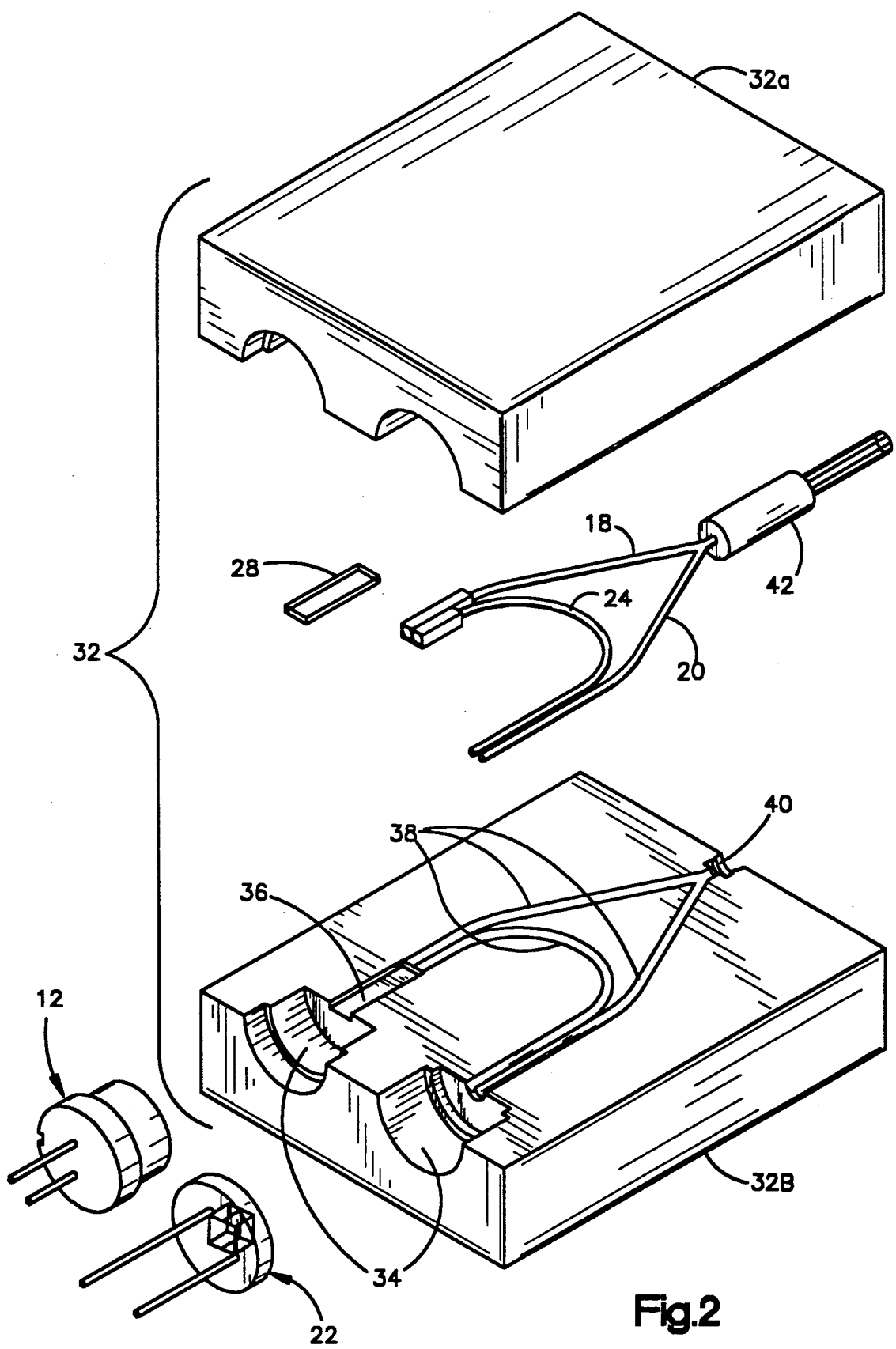
FIG. 2 is an exploded perspective of a mounting block assembly for a position sensor similar to that shown in FIG. 1.

Referring to FIG. 2, a mounting block 32 is used to conveniently hold the optical elements of the position sensor 10. The block 32 has an upper half 32a and a lower half 32b. In the preferred embodiment, lower half 32b has recesses 34 which are adapted to receive and hold, when upper half 32a is secured to the lower half 32b, the light source 12 and light detector 22. A slot 36 is provided to receive the mono-fiber mixer 28 and grooves 38 are adapted to receive the separate fiber-optic bundles 18, 20 and 24.

Another recess 40 is provided to receive and hold a cable connector ferrule 42 that physically holds the bundles 18 and 20 to the fiber-optic cable 16. The ferrule also secures the second mixer 28b when used. Thus, when the upper and lower halves of the block 32 are secured together, all of the optical elements are securely held thereby assuring reliable optical coupling. The free end of the flexible fiber-optic cable 16, of course, can be conveniently positioned proximate the object.

FIG. 4 is a simplified schematic block diagram of a circuit 50 useful with the optical position sensor 10 according to the present invention. A power drive circuit 52 provides electrical power to the laser diode 12. Each output of the bi-cell 22 (i.e. resulting from the incident reference and reflected light) is inputted to a respective conditioning circuit 54a, b which converts the current outputs from the bi-cell photodiodes into corresponding analog voltage signals. The conditioning circuits 54a, b also amplify these analog reference and measurement voltage signals. All of the circuitry shown schematically in FIG. 4 is of conventional design readily available in manufacturer's handbooks.

The amplified analog reference and measurement signals are then multiplexed and inputted to an analog to digital converter 56 to permit digital processing of the measurement and reference signals. Of course, the analog signals could simply be processed with an analog differential device such as an operational amplifier but digital processing is preferred to simplify calibration.

In the preferred embodiment, a microcontroller 58 is provided which includes an 8 bit microprocessor 60 and the analog to digital converter 56 on-chip. The microprocessor can be programmed in a conventional manner to compare the reference and measurement signals to determine position of the object. During each particular measurement, of course, the reference signal will be relatively constant and the measurement signal will vary in amplitude in relation to the intensity of light reflected by and received from the object. However, the actual value of the reference signal measured will vary with the time and temperature characteristics of the light source 12 and detector 22. Since the microprocessor differentially compares the reference and measurement signals, such variations are removed so that the difference between the reference and measurement signals represents the true relative position of the object.

While the invention has been shown and described with respect to a particular embodiment thereof, this is for the purpose of illustration rather than limitation, and other variations and modifications of the specific embodiments herein shown and described will be apparent to those skilled in the art within the intended spirit and scope of the claimed invention.

What is claimed is:

1. A device for sensing position of an object comprising:
   (a) a light source;
   (b) a light detector that produces signals proportional to intensity of light incident on said detector, said detector being a photovoltaic bi-cell that produces electrical signals proportional to the intensity of incident light thereon, and having first and second discrete regions for sensing incident light, said first region sensing incident reference light from said light source, and said second region sensing incident light reflected from the object;
   (c) a fiber-optic bundle for transmitting light from said light source to the object along a first light path, for transmitting light reflected from the object to said detector along a second light path, and for transmitting reference light from said source to said detector; and
   (d) means for processing said detector signals to determine positions of the object.

2. A position sensing device according to claim 1 wherein said fiber-optic bundle includes an illumination bundle for transmitting illumination light from said light source to the object, a measurement bundle for transmitting reflected light from the object to said light detector, and a reference bundle for transmitting reference light from said light source to said light detector.

3. A position sensing device according to claim 2 wherein said illumination and reference bundles form a bifurcated fiber-optic cable.

4. A position sensing device according to claim 2 wherein said fiber-optic bundle further includes a flexible fiber-optic cable having an output end that can be positioned proximate the object and an input end optically coupled to respective distal ends of said illumination and reference bundles.

5. A position sensing device according to claim 4 wherein one end of said illumination bundle opposite its distal end is adjacent said light source, and one end of said measurement bundle opposite its distal end is adjacent said light detector.

6. A position sensing device according to claim 5 wherein said reference bundle has one end adjacent said light source and a distal end adjacent said light detector.

7. A position sensing device according to claim 6 wherein said reference bundle distal end and measurement bundle distal end abut said light detector first and second regions respectively.

8. A position sensing device according to claim 4 further comprising a mono-fiber mixer that optically couples said illumination and measurement bundle distal ends with said fiber-optic cable.

9. A position sensing device according to claim 2 further comprising a mono-fiber mixer that optically couples said illumination bundle and said light source.

10. A position sensing device according to claim 9 wherein said mixer also optically couples said reference bundle to said light source.

11. A position sensing device according to claim 4 further comprising a neutral density filter disposed to filter light in said reference bundle.

12. A position sensing device according to claim 4 further comprising a gradient index lens, at said fiber-optic cable output end.

13. An optical device that can be interfaced with signal processing devices for determining positions of an object comprising a light source, a light detector that responds to light incident thereon and produces analog electrical signals related to the incident light wherein said light detector has two discrete regions having substantially identical photovoltaic responses for sensing incident light, means for transmitting light from said light source to the object and for transmitting reflected light from the object to one of said light detector regions and for transmitting light from said light source to the other of said light detector regions.

14. An optical device according to claim 13 wherein said means for transmitting light includes a bifurcated fiber-optic cable having a first fiber bundle that provides an illumination light path from said light source to the object and a second fiber bundle that provides a reflected light path from the object to said light detector.

15. An optical device according to claim 14 wherein said means for transmitting light further includes a third fiber bundle that provides a reference light path from said light source to said light detector.

16. An optical device according to claim 15 wherein said second fiber bundle and third fiber bundle have output ends that contact respective ones of said light detector regions.

17. An optical device according to claim 13 wherein said means for transmitting light includes illumination, measurement and reference fiber-optic bundles and a randomized fiber-optic cable, wherein one end of each of said illumination and measurement bundles being optically connected to respective halves of the fibers at one end of said fiber-optic cable.

18. An optical device according to claim 17 further comprising a mixer interposed between said illumination and measurement bundles and said one end of said fiber-optic cable.

19. An optical device according to claim 14 further comprising a mounting block having an upper half and a mateable lower half, said mounting block halves including recesses formed therein to receive and hold said light source, light detector, and to enclose portions of said means for transmitting light.

20. An optical device according to claim 19 wherein said fiber-optic cable is a flexible cable having one end held by said mounting block and the other end outside said mounting block for convenient positioning proximate the object.

* * * * *